Feb. 2, 1960   G. D. SIMONDS   2,923,141
CONSTANT VELOCITY UNIVERSAL JOINT
Filed July 8, 1958   2 Sheets-Sheet 1
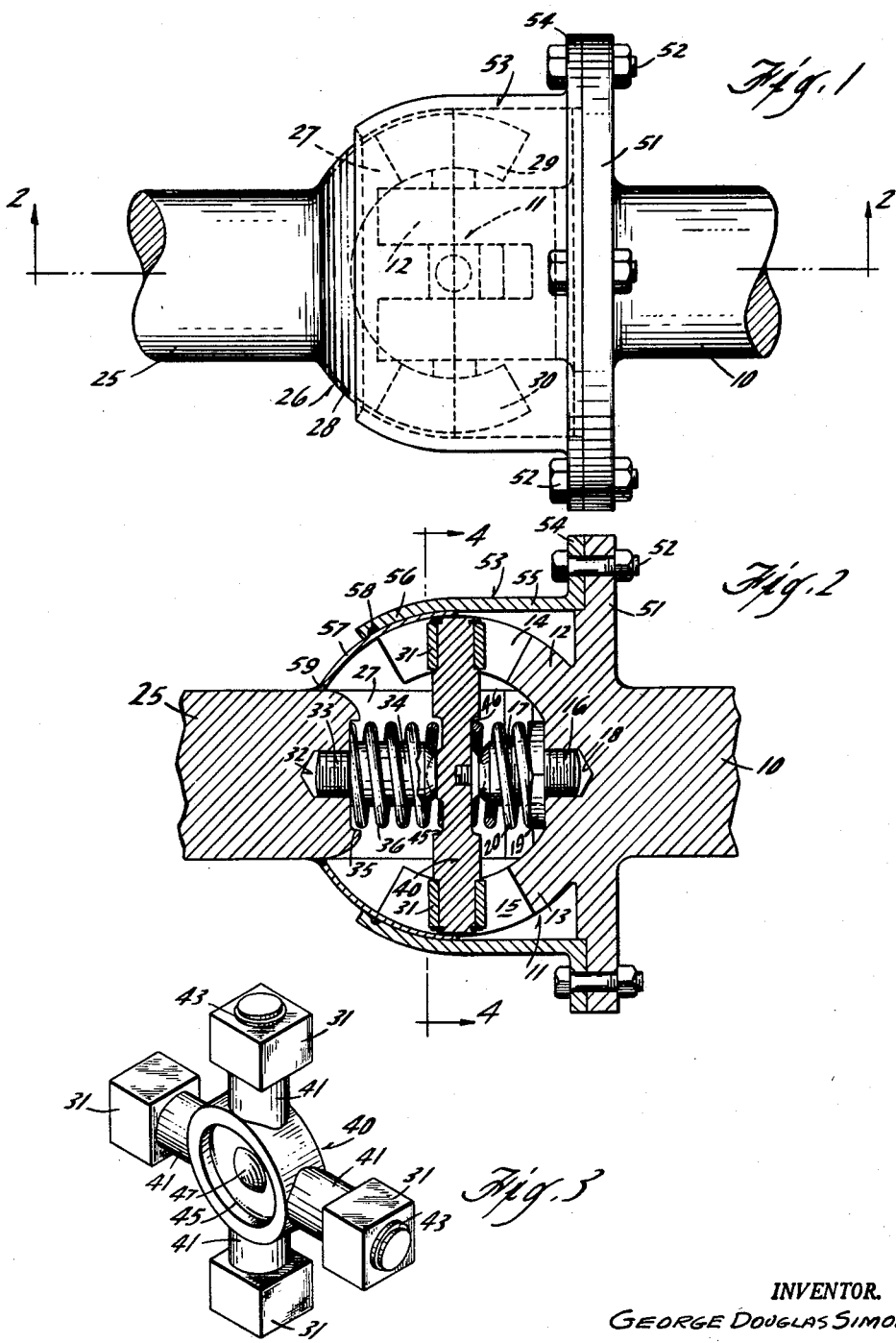
INVENTOR.
GEORGE DOUGLAS SIMONDS
BY
Wheeler, Wheeler & Wheeler
ATTORNEYS Feb. 2, 1960 G. D. SIMONDS 2,923,141
CONSTANT VELOCITY UNIVERSAL JOINT Filed July 8, 1958 2 Sheets-Sheet 2

INVENTOR.
GEORGE DOUGLAS SIMONDS
BY
Wheeler, Wheeler & Wheeler
ATTORNEYS

United States Patent Office 2,923,141
Patented Feb. 2, 1960

2,923,141

CONSTANT VELOCITY UNIVERSAL JOINT

George Douglas Simonds, Clintonville, Wis., assignor to FWD Corporation, a corporation of Wisconsin Application July 8, 1958, Serial No. 747,234

10 Claims. (Cl. 64—21)

This invention relates to constant velocity universal joints.

Conventional constant velocity universal joints utilize a floating middle member which is supposed to operate in the plane bisecting the angle between the driving and driven shafts. The middle member is provided with force-transmitting balls which move in registering meridian grooves in yoke arms on the shafts. At best they provide a line contact at the bearing surface between the respective shafts and the middle member. Thus, when large torques are transmitted through the universal joint from the driving to the driven shafts, excessive compressive stresses are generated which cause a rapid breakdown of the metal surfaces in the balls and grooves. My invention remedies this situation through the use of blocks in a sliding plane contact with the sides of the meridian grooves, in place of the balls aforesaid. It further provides positive axial positioning of the middle member, which was free to get out of position in known devices, and usually did. This is done by means of axial projections on the driving and driven shafts which engage the middle member at its center and ensure axial alignment. A dust shield prevents the entry of foreign matter, and limits outward axial movement of the yokes to maintain the projections in contact with the middle member. Springs, or equivalent devices, are mounted between the spider and the shafts to force the spider into a plane bisecting the angle formed by the two shafts.

The principal objects of my invention are to provide a universal joint of the constant velocity type having sufficient bearing surface whereby large torque loads may be transmitted therethrough, and to ensure that the middle member remains with its axis at the apex of the angle between the driving and driven shafts.

A further important object of my invention is to provide a constant velocity universal joint having a minimum number of parts and requiring no special equipment for the assembling of the component parts.

My novel invention comprises a constant velocity joint of the type described, in which the spider is held in the proper plane by springs bearing against the yokes and is held in the proper axial position by projections from the ends of the driving and driven shafts, sliding blocks being journaled to the ends of the spider arms within the yoke arm slots, and a dust shield to restrain axial displacement of the shafts.

In the drawings:

Figure 1 is a plan view of a universal joint embodying my invention.

Figure 2 is a cross-sectional view on line 2—2 of Fig. 1, with the springs, positioning studs and adjusting washer shown in full.

Figure 3 is a perspective view of the central spider.

Figure 4:
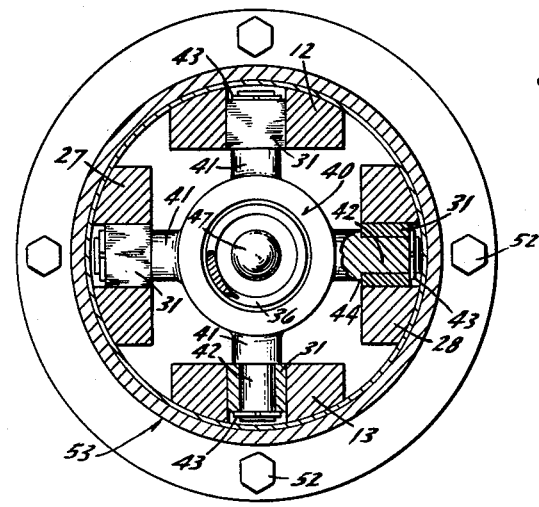
Figure 4 is a cross-sectional view on line 4—4 of Figure 2, with portions of the spider broken away.

Referring now to Figure 2, a driving shaft 10 terminates in a first yoke 11 which may be integral therewith or rigidly connected thereto. The arms 12 and 13 of yoke 11 are provided with longitudinally extending open ended slots 14 and 15, said slots preferably having flat sides. This preference is dictated by the greater ease with which a flat side may be milled as compared to sides curved inwardly or outwardly; however, either a flat or curved side could be used with equal success in the operation of my invention. In any event, the sides of slots 14 and 15 must, according to my invention, be a shape permitting face contact with the contact blocks 31 which slide therein, as will be described later.

The driven shaft 25 terminates in a second yoke 26 (see Fig. 1) which may be like yoke 11, either integral with the shaft or rigidly connected thereto. Yoke 26, like yoke 11, consists of arms 27 and 28 which are slotted at 29 and 30 to receive contact blocks 31 (see Fig. 3), said blocks being complementary to the faces of slots 29 and 30 for plane contact therewith.

Returning to Fig. 2, a bore 32 is provided in the end of shaft 25 and concentric with the axis thereof, and is threaded to receive stud 33 having an enlarged portion 34 to act as a stop to positively axially position the stud. A socket or spring seat 35 is formed in shaft 25 co-axial with bore 32 and shaft 25 to receive the end of spring 36.

The right side of Fig. 2 shows an alternate construction which may be used on one or both of the shafts. At the end of shaft 10, at its axis of rotation, is a bore 18 which is threaded to receive a stud 16. Stud 16 is provided with an enlarged portion 17, which acts as a stop to positively limit the penetration of stud 16 into bore 18. Portion 17 of stud 16 is also threaded, and carries a nut 19 which acts as an adjustable seat for spring 20. Spring 20 is concentric with stud 16.

As may be seen from Fig. 4, the yoke 11 on shaft 10, consisting of arms 12 and 13 is positioned 90 degrees from yoke 26 on shaft 25 consisting of arms 27 and 28, so that the four yoke arms are equally spaced and alternately oppositely directed.

In the space between the yoke arms is a spider 40 provided with radial arms 41 every ninety degrees. Mounted to each radial arm 41 is a contact block 31 which is journaled for rotation on a reduced portion 42 of radial arm 41. A lock ring 43 prevents outward movement of the contact block on arm 41, and a shoulder 44 at the beginning of the reduced portion 42 prevents inward movement. Each contact block 31 is journaled in a slot 14, 15, 29, or 30 for oscillation along its respective yoke arm 12, 13, 27, 28, each yoke arm being curved on an arc having as its center the intersection of the axes of shaft 10 and shaft 25, this point also being the center of spider 40.

Figure 5:
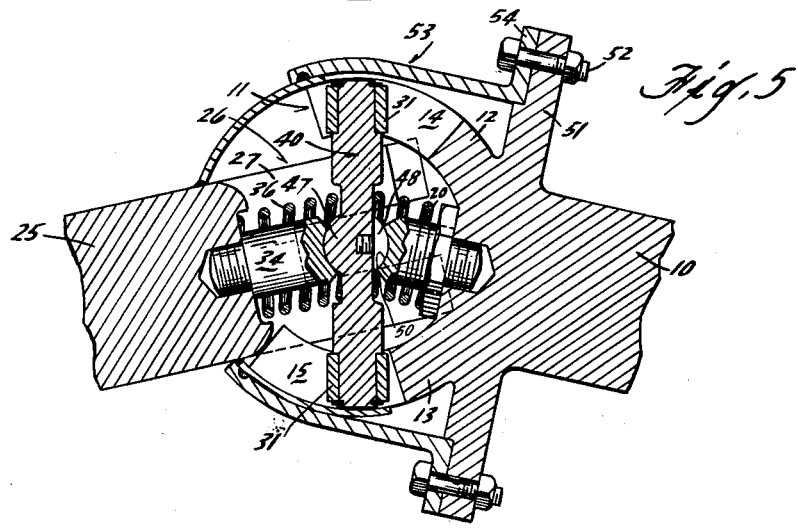
Figure 5 is a cross-sectional view similar to Figure 2 in which the driving shaft and the driven shaft are at an angle to one another.

As is best shown in Figs. 2 and 3, spider 40 is provided with recessed center portions 45 and 46 on opposite sides of the spider and co-axial therewith, to receive springs 20 and 36. At the center of spring seats 45 and 46, bosses 47 and 48 are provided. The surface of each boss is a section of a sphere having its center at the apex of the angle of shafts 10 and 25, and will hereafter be referred to as "spherical." As shown in Figure 5, these may be integral with the spider 40, or may consist of studs having spherical heads of the required radius which are screwed into the spider, or secured in any other appropriate manner. For production reasons the form of boss 48, consisting of a threaded stud with a spherical head is preferred. Studs 16 and 33 are each provided with a depression 50 of spherical form at the end of the stud to engage bosses 47 and 48. The studs are positively axially positioned by engagement of the enlarged portions 17 and 34 with the surface of the respective shafts, thus spider 40 is positively positioned so that its center coincides with the intersection of the axes of shafts 10 and 25, although the spider is free to oscillate about the center due to the ball and socket engagement between the bosses and the studs.

In order to further ensure axial alignment, and to protect the mechanism against the entrance of foreign matter, a radial flange 51 is provided at the base of yoke 11 which is bored at spaced points about its periphery to receive bolts 52. A dust shield 53 is provided with a mating radial flange 54 which is likewise bored to receive bolts 52. Dust shield 53 consists of a cylindrical portion 55 extending to the center of the universal joint and a portion 56 which is a section of a sphere. Portion 56 has surface contact with a separate complementary dust shield 57 which is also a section of a sphere and which is attached to shaft 25 by any appropriate method such as weld 59.

In assembling the joint, studs 16 and 33 are screwed into the respective bores 32 and 18 in shafts 10 and 25. If nuts 19 are to be used as seats for one or both of springs 20 and 36 the nuts are screwed onto the enlarged portions 17 and 34. The springs 20 and 36 are then placed around studs 16 and 33 to seat on nuts 19, or in depressions 35 if no nuts 19 are used. The dust shield 57 is then secured to shaft 25. Spider 40 is inserted between the ends of studs 16 and 33 with contact blocks 31 within the grooves in the yoke arms. Dust shield 53 may then be bolted to flange 51 bringing the surfaces of dust shield 57 in contact with portion 56 of dust shield 53. An O-ring 58 is compressed between the two dust shields in a groove in one of the shields to give additional assurance of a sufficient seal to keep out foreign matter. In addition to the axial positioning of the spider by means of studs 16 and 33, shafts 10 and 25 are prevented from moving axially or becoming misaligned by dust shield 51 and 57.

In operation, power is transmitted from shaft 10 through arms 12 and 13 of yoke 11 to contact blocks 31 at opposite sides of spider 40. The remaining contact blocks 31 on the spider transmit the power to arms 27 and 28 of yoke 26 and thence to shaft 25. When the shafts 10 and 25 are set at an angle to one another, dust shields 53 and 57 slide along their spherical contact surfaces to accommodate the movement. Spider 40 is free to assume any angular position with respect to the shafts due to its ball and socket engagement. Studs 16 and 33 maintain spider 40 coaxial with shafts 10 and 25. Springs 20 and 36 urge spider 40 to a position in which they exert equal and opposite forces on each side of the spider at any given point on the circumference of spring sockets 45 and 46. The only position of spider block 40 which satisfies this condition is a plane bisecting the angle between shafts 10 and 25. Other resilient biasing members could be substituted for the springs. It is also possible for the biasing members to be located on the same side of the spider, as long as they derive the force which is exerted on a given sector of the spider from the position of their respective shafts. The arcuate slots 14, 15, 29, and 30 in the yoke arms permit contact blocks 31 to be driven from any position they may assume, and the fact that contact blocks 31 are rotatably journaled on radial arms 41 of spider 40 accommodates the misalignment which occurs between the contact blocks and at least one pair of the radial arms. Because the spider 40 of the universal joint operates in a plane bisecting the angle between the shafts, there will be no rotational vibration transmitted to driven shaft 25, thus prolonging the life of the parts. The life of the joint is also greatly prolonged by the fact that contact blocks 31 have face contact with the slots in the yoke arms, rather than point or line contact. Although these blocks are shown as cubical in Figure 3, they may take other appropriate forms having face contact with the slots in the yoke arms.

I claim:

1. In a universal joint comprising a driving shaft, a driven shaft rotatable on an axis which intersects the axis of the driving shaft, a yoke at the end of the driving shaft comprising opposed arms extending toward the driven shaft in a plane common to the axis of the driving shaft, a yoke on the driven shaft extending toward the driving shaft comprising opposed arms in the plane of the axis of the driven shaft, said yokes on the driving and driven shafts being angularly offset from each other, said opposed arms in each yoke being longitudinally slotted over a substantial proportion of their length, an intermediate member between said shafts comprising a spider having radial arms, an arm of said spider extending into each said slot in each said yoke arm, and a bearing block rotatably journaled on said arm of said spider within said slot, said bearing blocks having opposed faces in face contact with opposing sides of said slots, the improvement comprising opposed resilient members mounted between said shafts and said spider and further comprising means for varying the strength of at least one of said resilient members.

2. The device of claim 1 further comprising means between the ends of the shafts and said spider to positively position the center of said spider at the intersection of the axes of the respective shafts.

3. The device of claim 2 in which said means comprise extensions of the driving and driven shafts provided with spherical depressions at their ends concentric with the axes of the respective shafts, the centers of curve of said spherical depressions being the point where the axes of said shafts intersect, and spherical bosses on said spider seated in said depressions, the center of curve of said bosses being the point of intersection of said axes.

4. In a universal joint comprising a longitudinally slotted yoke extending from the end of a shaft, a longitudinally slotted yoke extending from the end of a second shaft and interdigitating with said first yoke, and a spider having arms extending into the slots in the respective yokes to transmit rotary motion from one of said yokes to the other of said yokes, the combination comprising positioning means extending axially from the ends of said shafts into contact with the central portion of said spider, the bearing surface between said means and said spider being portions of a sphere having its center at the intersection of the axes of the said shafts whereby to positively position the center of said spider at said intersection, and resilient means between said shafts and said spider concentric with said positioning means and adapted to urge said spider into a plane bisecting the angle formed by the axes of said shafts.

5. The device of claim 4 further comprising means for adjusting the tension of at least one of said resilient means.

6. The device of claim 5 further comprising dust cover means for preventing displacement of said shafts away from the center of said spider.

7. In a universal joint comprising a first shaft, a second shaft whose axis intersects the axis of the first shaft, a yoke on each of said shafts comprising two opposed slotted arms, said yokes being angularly related, a spider having its center at the intersection of the axes of said shafts, said spider having arms provided with means journaled for oscillation within said slots, a shell outside of said yoke arms attached to one of said shafts, and a complementary shell secured to the other of said shafts, said second shell having sealing engagement with said first shell, the outer of said shells having a reduced portion and the inner of the said shells having an enlarged portion whereby to prevent displacement of said shafts axially away from the point of intersection of their axes, the improvement comprising means between said shafts and said spider to prevent axial movement of said shafts toward said spider.

8. In a universal joint comprising a driving shaft having an axis, a yoke at the end of the driving shaft consisting of two opposed arms, a driven shaft having an axis intersecting the axis of said driving shaft, a yoke at the end of the driven shaft consisting of two opposed arms angularly related to the arms of the first mentioned yoke, said arms in each yoke being longitudinally slotted, a spider between said yokes having radial arms, each arm of said spider being journaled for oscillation along one said slot and positioning means extending axially from said driving and driven shafts to engage said spider and positively position said spider with its center at the intersection of the axes of the said driving and driven shafts, the combination comprising resilient means extending between the ends of said driving and driven shafts and said spider to position said spider in a plane which bisects the angle between the axes of said driving and driven shafts, and means for adjusting the stress upon at least one said resilient means.

9. The device of claim 8 in which the means for adjusting the stress upon said resilient means comprises a threaded stud extending axially of a said shaft, and a nut threaded on said stud and underlying said resilient means.

10. The device of claim 9 in which said resilient means are helical springs, at least one of which is seated on a said nut.

References Cited in the file of this patent

UNITED STATES PATENTS

| | | |
|---|---|---|
| 1,290,825 | Wood | Jan. 7, 1919 |
| 1,625,410 | De Ram | Apr. 19, 1927 |
| 1,968,925 | Barish | Aug. 7, 1934 |
| 2,293,717 | Dodge | Aug. 25, 1942 |
| 2,341,084 | Dodge | Feb. 8, 1944 |
| 2,441,347 | Dodge | May 11, 1948 |